United States Patent
Fell et al.

(10) Patent No.: US 6,401,534 B1
(45) Date of Patent: Jun. 11, 2002

(54) TWIN AXIS GYROSCOPE

(75) Inventors: Christopher Fell, Plymouth; Colin Hnery John Fox, Nottingham, both of (GB)

(73) Assignee: Bae Systems PLC, Farnborough (GB)

( * ) Notice: Subject to any disclaimer, the term of this patent is extended or adjusted under 35 U.S.C. 154(b) by 0 days.

(21) Appl. No.: 09/417,302

(22) Filed: Oct. 13, 1999

Related U.S. Application Data

(63) Continuation of application No. PCT/GB99/00730, filed on Mar. 10, 1999.

(30) Foreign Application Priority Data

Mar. 14, 1998 (GB) ............................................. 9805388

(51) Int. Cl.⁷ ............................................. G01C 19/00
(52) U.S. Cl. ................................................. 73/504.13
(58) Field of Search .................. 73/504.13, 504.12, 73/504.02, 504.14

(56) References Cited

U.S. PATENT DOCUMENTS

| | | | |
|---|---|---|---|
| 3,206,985 A | | 9/1965 | Christensen .................. 73/505 |
| 5,226,321 A | * | 7/1993 | Varnham et al. ............... 73/505 |
| 5,915,276 A | * | 6/1999 | Fell .......................... 73/504.13 |

FOREIGN PATENT DOCUMENTS

| | | |
|---|---|---|
| EP | 0 461 761 | 12/1991 |
| EP | 0 729 010 | 8/1996 |
| GB | 2 154 739 | 9/1985 |
| GB | 2 318 184 | 4/1998 |

OTHER PUBLICATIONS

G. C. Newton, Jr.: A Rate Gyroscope Based on Interaction of Sonic Waves, IEEE Transactions on Automatic Control, vol. AC–10, No. 3, Jul. 1965, pp. 235–243, New York, US.

* cited by examiner

*Primary Examiner*—Richard A. Moller
(74) *Attorney, Agent, or Firm*—Kenyon & Kenyon

(57) ABSTRACT

A two axis gyroscope has a substantially planar vibratory resonator having a substantially ring or hoop-like shape structure, carrier mode drive means for causing the resonator to vibrate in a $\cos n\theta$ out-of-plane carrier mode, where n has an integer value of 2 or more, support means for flexibly supporting the resonator, carrier mode pick-off means for sensing out-of-plane movement of the resonator, X axis response mode pick-off means for sensing in-plane $\cos n_1\theta$ response mode movement of the resonator in response to rotation of the gyroscope about the X axis, where $n_1$ has a value of $n+1$ or $n-1$, and Y axis response mode pick-off means for sensing in-plane $\sin n_1\theta$ response mode movement of the resonator in response to rotation of the gyroscope about the Y axis where $n_1$ has a value of $n+1$ or $n-1$, identical to that for the X axis response mode.

19 Claims, 8 Drawing Sheets

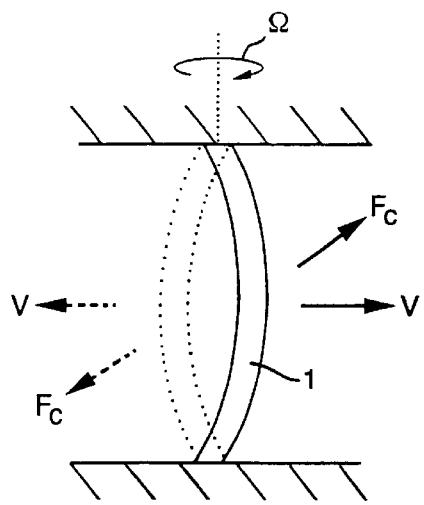
Fig.1a. *PRIOR ART*
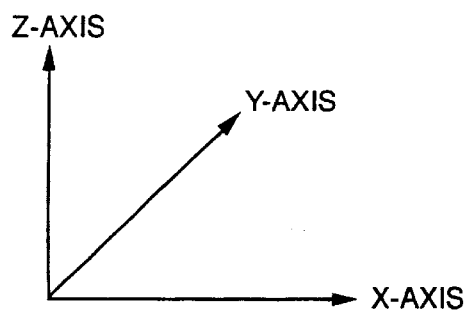
Fig.1b. *PRIOR ART*
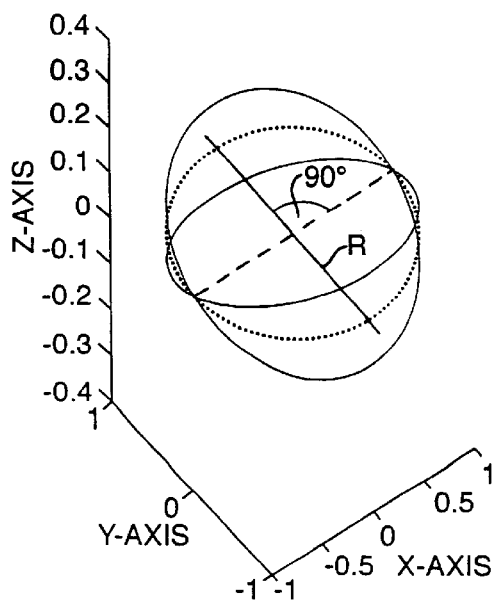
Fig.2a.
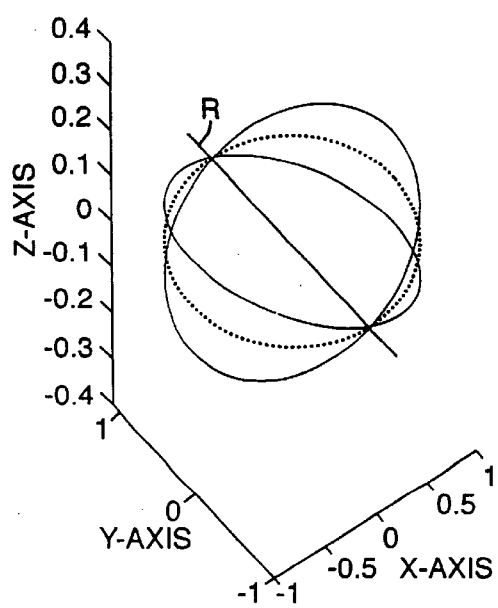
Fig.2b.

TWIN AXIS GYROSCOPE

This application is a continuation of PCT/GB99/00730 filed Mar. 10, 1999.

This invention relates to a two axis gyroscope. Vibrating structure gyroscopes may be fabricated using a variety of different structures as the resonant element. These include beams, tuning forks, cylinders, hemispherical shells and rings. Successful commercial exploitation is dependent upon optimising the device performance while minimising the cost. An additional goal for some applications is reducing the size of the device.

Some conventional vibrating structure gyro designs are suitable for fabrication using modern micro-machining techniques. These may be constructed from bulk Silicon, polysilicon or electro-formed metal. These fabrication methods provide the capability of producing miniature gyros in high volume and at reduced cost.

Many applications for gyroscopic devices require rate sensitivity about at least two axes. Conventional vibrating structure gyros provide single axis rate sensitivity and therefore two devices are required which must be aligned along orthogonal axes. A vibrating structure gyroscope incorporating a resonator design which is inherently capable of sensing rate around two axes simultaneously would therefore be of great benefit. A single device would thus replace two conventional single axis units with obvious cost benefits. Also, the process of mounting and aligning the two single axis gyros would not be required.

There is thus a need for an improved vibrating structure gyroscope design capable of sensing rate about two axes simultaneously.

SUMMARY OF THE INVENTION

According to one aspect of the present invention there is provided a two axis gyroscope including a substantially planar vibratory resonator having a substantially ring or hoop-like shape structure with inner and outer peripheries extending around a common axis, carrier mode drive means for causing the resonator to vibrate in a $\cos n\theta$ out-of-plane carrier mode, where n has an integer value of 2 or more, support means for flexibly supporting the resonator and for allowing the resonator to vibrate, in response to the carrier mode drive means, relative to the support means, carrier mode pick off means for sensing out-of-plane movements of the resonator, X axis response mode pick-off means for sensing in-plane $\cos n_1\theta$ response mode movement of the resonator in response to rotation of the gyroscope about the X axis where $n_1$ has a value of n plus 1 or n minus 1, and Y axis response mode pick-off means for sensing in-plane $\sin n_1\theta$ response mode movement of the resonator in response to rotation of the gyroscope about the Y axis, where $n_1$ has a value of n plus 1 or n minus 1, identical to that for the X axis response mode.

Preferably, the gyroscope includes X axis response mode drive means for nulling the X axis response mode movement of the resonator to permit the gyroscope to be operated in a forced feedback configuration.

Conveniently, the gyroscope includes Y axis response mode drive means for nulling the Y axis response mode movement of the resonator to permit the gyroscope to be operated in a forced feedback configuration.

Advantageously, the support means includes a plurality of flexible legs flexibly connecting the resonator to a support, with the number of legs being given by N equals $4n_1$ and with the angular separation between the legs being given by 360° divided by N.

Preferably, the resonator is made from metal, quartz, polysilicon or bulk silicon.

Conveniently, the drive means and/or the pick-off means are electrostatic, electromagnetic, piezo or optical.

Advantageously, the carrier mode is a $\cos 2\theta$ out-of-plane mode, the X axis response mode is an in-plane $\sin\theta$ mode, and the Y axis response mode is an in-plane $\cos\theta$ mode, with the carrier mode drive means including two drive elements located at 0° and 180° with respect to a fixed reference axis in the plane of the resonator, with the carrier mode pick-off means including two pick-off elements located at 90° and 270° with respect to the fixed reference axis, with the X axis pick-off means including a pick-off element located at 0° with respect to the fixed reference axis, with the Y axis pick-off means including a pick-off element located at 90° with respect to the fixed reference axis, with the X axis drive means including a drive element located at 180° with respect to the fixed reference axis and with the Y axis drive means including a drive element located at 270° with respect to the fixed reference axis.

Preferably, the carrier mode is an out-of-plane $\cos 2\theta$ mode, the X axis response mode is an in-plane $\sin 3\theta$ mode, and the Y axis response mode is an in-plane $\cos 3\theta$ mode, with the carrier mode drive means including two drive elements located at 0° and 180° with respect to a fixed reference axis in the plane of the resonator, with the carrier mode pick-off means including two pick-off elements located at 90° and 270° with respect to the fixed reference axis, with the X axis pick-off means including three pick-off elements located at 0°, 120° and 240° with respect to the fixed reference axis, with the Y axis pick-off means including three pick-off elements located at 30°, 150° and 270° with respect to the fixed reference axis, with the X axis drive means including three drive elements located at 60, 180° and 300° with respect to the fixed reference axis and with the Y axis drive means including three drive elements located at 90°, 210° and 330° with respect to the fixed reference axis.

Conveniently, the carrier mode is an out-of-plane $\cos 3\theta$ mode, the X axis response mode is an in-plane $\sin 2\theta$ mode, and the Y axis response mode is an in-plane $\cos 2\theta$ mode, with the carrier mode drive means including three drive elements located at 0°, 120° and 240° with respect to the fixed reference axis in the plane of the resonator, with the carrier mode pick-off means including three pick-off elements located 60°, 180° and 300° with respect to the fixed reference axis, with the X axis pick-off means including two pick-off elements located at 0° and 180° with respect to the fixed reference axis, with the Y axis pick-off means including two pick-off elements located at 45° and 225° with respect to the fixed reference axis, with the X axis drive means including two drive elements located at 90° and 270° with respect to the fixed reference axis, and with the Y axis drive means including two drive elements located at 135° and 315° with respect to the fixed reference axis.

Advantageously, the carrier mode is an out-of-plane $\cos 3\theta$ mode, the X axis response mode is an in-plane $\sin 4\theta$ mode, and the Y axis response mode is an in-plane $\cos 4\theta$ mode, with the carrier mode drive means including three drive elements located at 0°, 120° and 240° with respect to the fixed reference axis in the plane of the resonator, with the carrier mode pick-off means including three pick-off elements located at 60°, 180° and 300° with respect to the fixed reference axis, with the X axis pick-off means including four pick-off elements located at 0°, 90°, 180° and 270° with respect to the fixed reference axis, with the Y axis pick-off means including four pick-off elements located at 22.5°, 112.5° 202.5° and 292.5° with respect to the fixed reference axis with the X axis drive means including four drive elements 45°, 135°, 225° and 315° with respect to the fixed reference axis, and with the Y axis drive means including four drive elements located at 67.5°, 157.5°, 247.5° and 337.5° with respect to the fixed reference axis.

BRIEF DESCRIPTION OF THE DRAWINGS

For a better understanding of the present invention, and to show how the same may be carried into effect, reference will now be made, by way of example, to the accompanying drawings, in which:

FIG. 1a is a schematic representation of a vibrating beam structure gyroscope not according to the present invention;

FIG. 1b is a graphic representation of the three orthogonal axes for the gyroscope of FIG. 1a;

FIGS. 2a and 2b are graphic representations on three axes of the vibration mode shapes in a two axis gyro according to the present invention utilising Cos nθ out-of-plane carrier modes, where n=1;

DETAILED DESCRIPTION

A common feature of all conventional vibrating structure gyro designs is that they maintain a resonant carrier mode oscillation. This provides the linear momentum which produces the Coriolis force $F_c$, when the gyro is rotated around the appropriate axis. The magnitude of this force is given by:

$$F_c = 2\Omega mv \quad (1)$$

where Ω is the applied rate, m is the mass and v the linear velocity. The velocity, rotation and force vectors lie along mutually orthogonal axes as shown in FIG. 1a of the accompanying drawings.

One of the simplest implementations for a vibrating structure gyro is a beam 1 shown in FIG. 1a. The carrier mode vibration is a bending motion in the xz-plane as shown in FIGS. 1a and 1b. A rotation applied about the axis of the beam 1 (z-axis) will generate Coriolis forces which set the beam 1 into motion in the yz-plane, at the carrier frequency. The amplitude of motion in this axis will be proportional to the applied rotation rate. The sensitivity of such a device may be enhanced by designing the structure such that the Coriolis force directly excites a resonant mode. The amplitude of motion is then amplified by the Q of the response mode. For a simple beam 1 made of isotropic material this will be achieved using a beam of square cross-section where the x and y dimensions are matched.

A rotation about the y-axis will also induce Coriolis forces in the beam 1. These will act along the length of the beam (z-axis). The beam is extremely stiff in this direction and is therefore insensitive to these forces. However, this simple linear vibration along a single axis is able to respond to rotations around two axes. Implementation of a practical gyroscope based on these responses requires a resonator design that enables these Coriolis force components to couple directly into response modes along the appropriate axes.

Planar ring structures utilising Cosnθ out-of-plane carrier modes are inherently capable of two axis rate sensitivity. The carrier mode motion is along a single direction (z-axis) and therefore Coriolis forces will be generated when the structure is rotated about either of the in-plane axes. In order to be of practical use as a gyroscope, the amplitude of motion induced by the Coriolis forces must be sufficient to provide adequate rate measurement sensitivity. This sensitivity may be achieved if the forces can be coupled directly into in-plane resonance modes thereby amplifying the induced motion by the Q of the response modes.

Figure 3A:
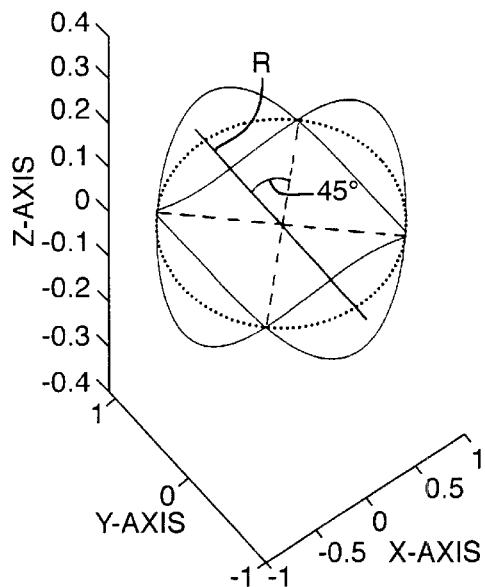
FIGS. 3a and 3b are graphic representations on three axes of the vibration modes for a gyroscope according to the present invention utilising Cos nθ out-of-plane vibrating modes for n equals 2.
Figure 3B:
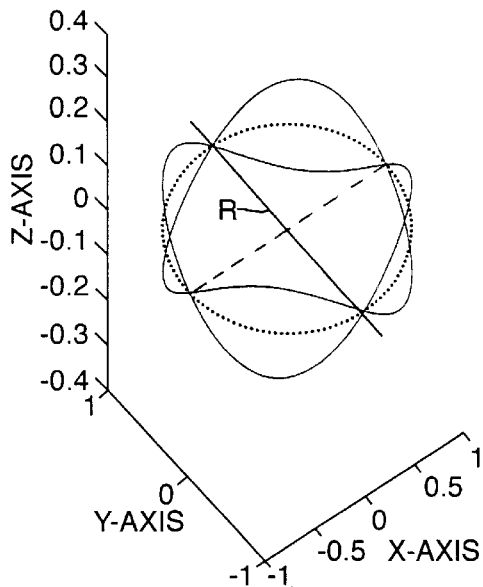
Figure 4A:
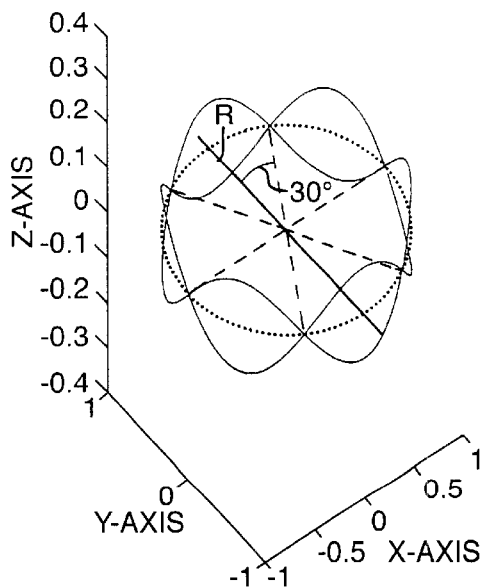
FIGS. 4a and 4b are graphic representations on three axes of the mode shapes for a gyroscope according to the present invention for n=3 modes.
Figure 4B:
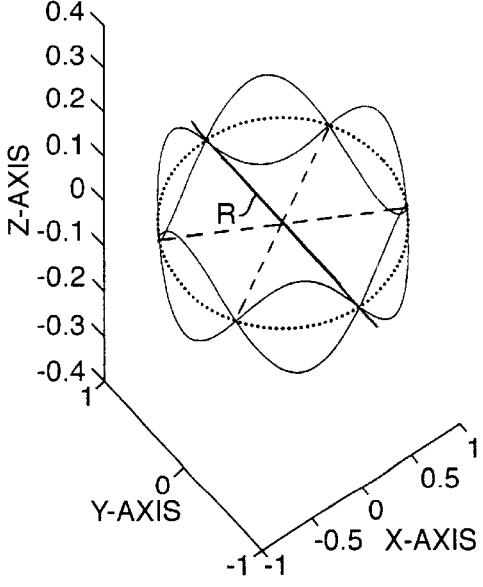
Figure 5A:
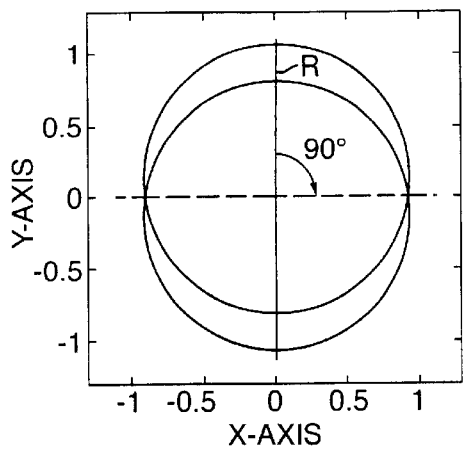
FIGS. 5a through 8b are graphic representations of Y axis against X axis in-plane vibration mode shapes for $n_1$ equals 1 for FIGS. 5a and 5b, n equals 2 for FIGS. 6a and 6b, $n_1$ equals 3 for FIGS. 7a and 7b and $n_1$ equals 4 for FIGS. 8a and 8b.
Figure 5B:
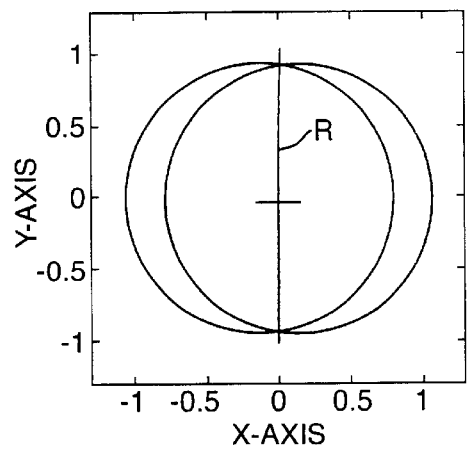
Figure 6A:
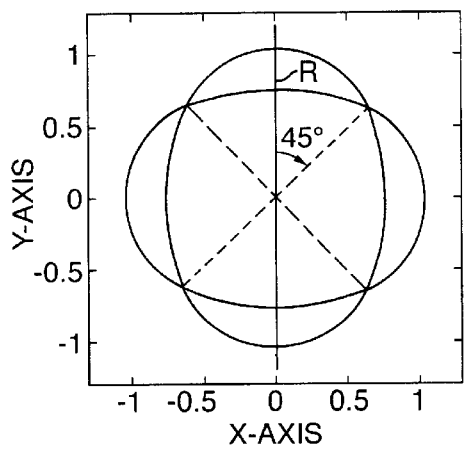
Figure 6B:
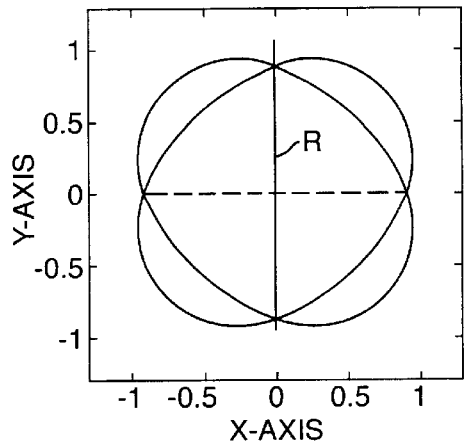
Figure 7A:
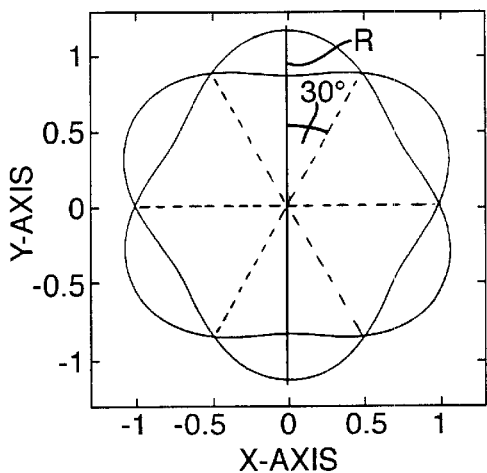
Figure 7B:
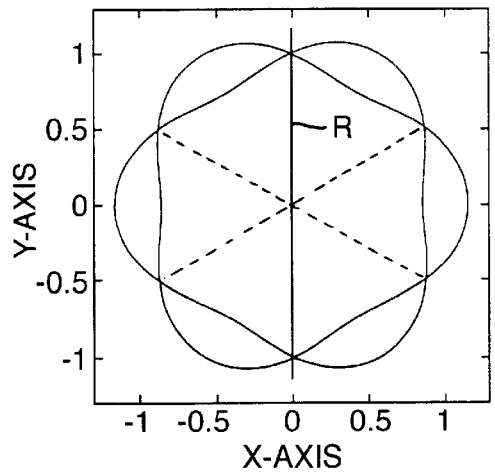
Figure 8A:
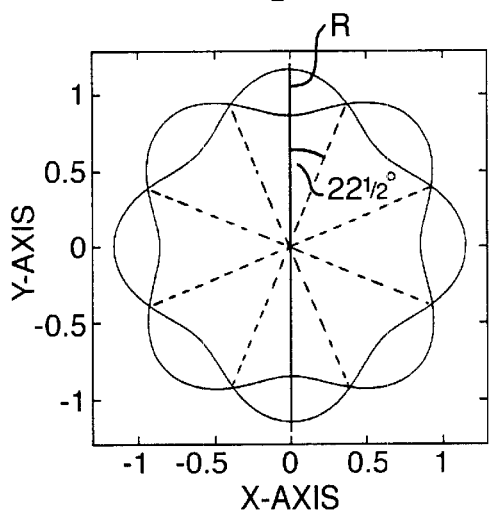
Figure 8B:
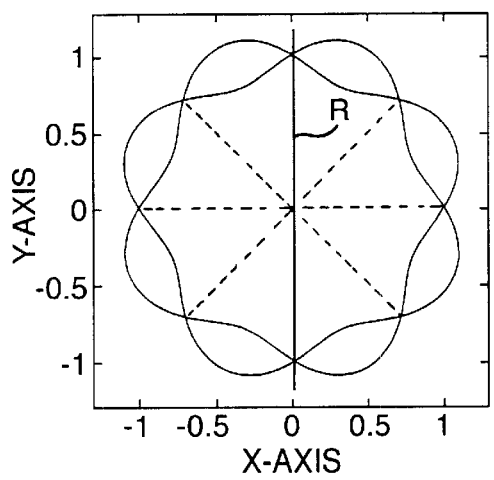

For perfect ring resonator structures the Cosnθ out-of-plane vibration modes exist as degenerate pairs at a mutual angle of (90/n)°. Using a fixed reference axis R in the plane of the resonator, these mode pairs will have shapes which exhibit Cosnθ and Sinnθ displacements. The fixed θ=0° reference axis R for the modal diagrams is along the y-axis in the positive direction. The mode shapes for n=1 are shown in FIGS. 2a and 2b. The two extremes of maximum displacement from the unexcited ring position, during a single vibration cycle, are shown for each mode of the pair. The axes indicate the displacement from the unexcited ring position (dotted line) for a ring of radius 1.0 (arbitrary units). The modes exist at a mutual angle of 90°. The mode shapes for n=2 are similarly shown in FIGS. 3a and 3b. These exist at a mutual angle of 45°. The corresponding shapes for the n=3 modes are shown in FIGS. 4a and 4b and exist at a mutual angle of 30°.

Using Cosnθ out-of-plane carrier modes, rotations along axes in the plane of the ring will give rise to Coriolis forces. An applied rotation about the y axis will give rise to Coriolis forces acting along the x-axis. The distribution of these forces will vary with angular position θ and may be resolved into radial and tangential components. For an applied rotation about the y-axis, $\Omega_y$, these force components will be given by:

$$F_{cr}(\theta) = F_{(n+1)r}\Omega_y \sin(n+1)\theta + F_{(n-1)r}\Omega_y \sin(n-1)\theta \quad (2)$$

$$F_{ct}(\theta) = F_{(n+1)t}\Omega_y \cos(n+1)\theta - F_{(n-1)t}\Omega_y \cos(n-1)\theta \quad (3)$$

Where $F_{cr}(\theta)$ is the distribution of radially directed in-plane Coriolis forces and $F_{ct}(\theta)$ is the distribution of tangentially directed in-plane forces. The parameters $F_{(n+1)r}, F_{(n-1)r}$ and $F_{(n+1)t}$ and $F_{(n-1)t}$ are constants which depend on the precise geometry of the ring and the support means, the material and the value of n.

For the same carrier modes, a rotation about the x-axis will induce Coriolis forces acting along the y-axis. These may again be resolved into radial and tangential components which for an applied rotation, $\Omega_x$, will be given by:

$$F_{cr}(\theta) = F_{(n+1)r} \Omega_x \cos(n+1)\theta + F_{(n-1)r} \Omega_x \cos(n-1)\theta \quad (4)$$

$$F_{ct}(\theta) = F_{(n+1)t} \Omega_x \sin(n+1)\theta - F_{(n-1)t} \Omega_x \sin(n-1)\theta \quad (5)$$

These force components may be used directly to excite in-plane vibration modes of the ring resonator. The in-plane vibration mode shapes for $n_1 = 1, 2, 3$ and $4$ are shown in FIGS. 5a to 8b. These modes exist as degenerate pairs at a mutual angle of $(90/n_1)°$. The plots show the maximum displacements from the rest position for a ring of nominal radius 1.0 (arbitrary units). The way in which these modes are excited may be illustrated by way of example for a specific carrier mode.

Figure 9A:
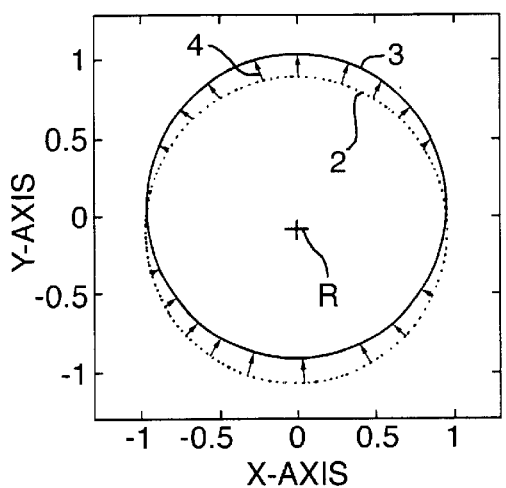
FIGS. 9a and 9b are graphic representations of Y axis against X axis for a resonator of a gyroscope according to the present invention excited into a Cos 2θ out-of-plane carrier mode rotated round the X axis showing the radial Coriolis force components generated.
Figure 9B:
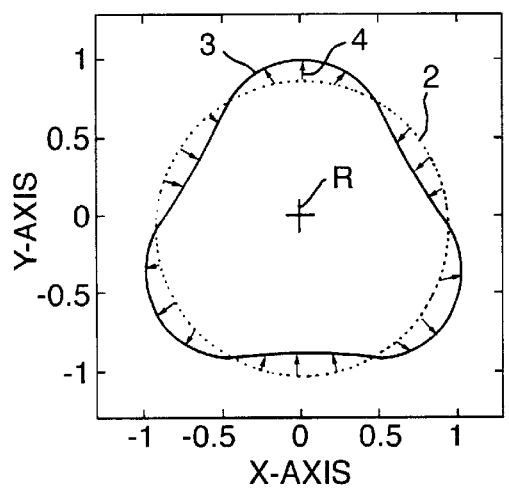
Figure 10A:
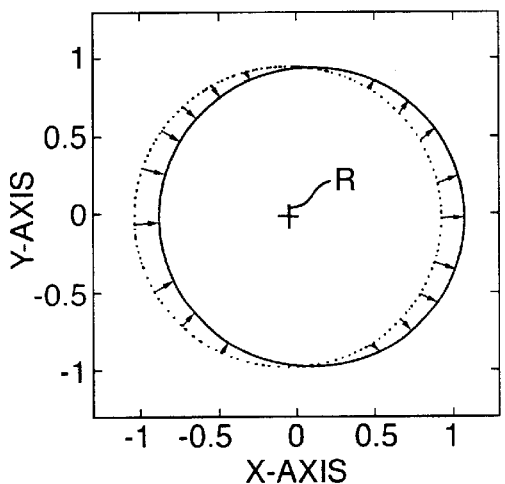
FIGS. 10a and 10b show the generation of Coriolis force components similar to that of FIGS. 9a and 9b but generated by rotation around the Y axis.
Figure 10B:
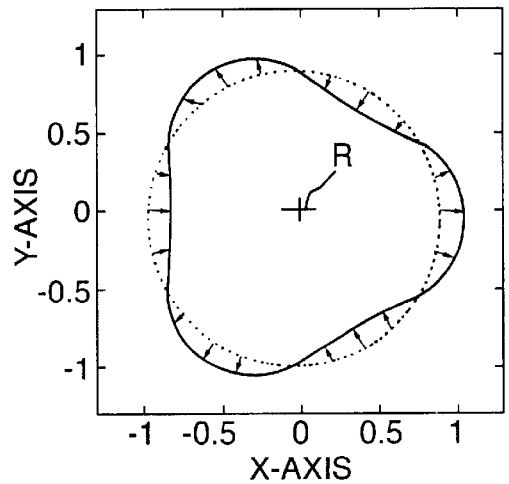

For a ring resonator excited into a $\cos 2\theta$ out-of-plane carrier mode, rotated around the x-axis, radial Coriolis force components will be generated with $\cos\theta$ and $\cos 3\theta$ functional forms. These are plotted in FIGS. 9a and 9b. The dotted line 2 indicates the rest position of a ring of nominal radius 1.0 (arbitrary units) where the x and y axes pass through the centre of the ring. The forces act radially through the centre point (0,0) with the magnitude shown by the solid line 3. This is illustrated more graphically by the arrows 4 which represent force vectors acting at discrete points on the ring circumference. Similar plots can be produced for the tangential components. These force components have functional forms which match those of the in-plane vibration modes of the ring shown in FIGS. 5a and 7a. A rotation around the y-axis will result in the generation of Coriolis force components with $\sin\theta$ and $\sin 3\theta$ functional forms. These are plotted in FIGS. 10a and 10b. These functional forms match the modal patterns shown in FIGS. 5b and 7b.

In order to implement a practical gyro design, the amplitude of the response mode motion must be maximised. This requires the ring dimensions to be designed such that the frequency of the carrier mode and response modes are matched. The resultant motion will thus be amplified by the Q of the response mode vibration giving enhanced sensitivity. The out-of-plane mode frequencies are profoundly affected by changes in the depth (z-axis dimension) of the ring. The in-plane mode frequencies are not sensitive to this change and hence it is possible to differentially shift the frequencies of the out-of-plane carrier and in-plane response modes to bring them into balance. Using the appropriate ring dimensions, a practical two axis gyroscope according to a first embodiment of the present invention has a $\cos 2\theta$ out-of-plane carrier mode in combination with $\sin\theta$ and $\cos\theta$ in-plane response modes. The ring dimensions may also be chosen to implement a further example to the present invention using the same carrier mode in combination with $\sin 3\theta$ and $\cos 3\theta$ in-plane response modes.

Additional two axis gyroscope designs according to the present invention use alternative carrier and response mode combinations, as indicated by equations 2 to 5. A $\cos 3\theta$ out-of-plane carrier mode may be used in combination with $\sin 2\theta$ and $\cos 2\theta$ in-plane response modes. This same carrier mode may also be used in combination with $\sin 4\theta$ and $\cos 4\theta$ response modes. Additional higher order mode combinations are possible but become progressively less practical to implement. Their usefulness is restricted by the complexity of the mode shape which requires the use of complex arrangements of drive and pick-off elements.

A two axis gyroscope according to the present invention may be constructed by using a $\cos 2\theta$ out-of-plane carrier mode in combination with $\sin\theta$ and $\cos\theta$ in-plane response modes. This gyroscope requires the frequencies of three modes to be matched (one carrier plus two response modes). For a perfectly symmetric ring 5 of uniform thickness, the $\sin\theta$ and $\cos\theta$ mode pair will have identical frequencies. The out-of-plane modes also exist as degenerate pairs and there will thus be a $\sin 2\theta$ mode, at the carrier frequency, at an angle of 45°. In a practical implementation it is convenient deliberately to induce a frequency separation between the modes. This will also set the carrier mode position at a fixed orientation on the ring 5. This has the advantage of preventing any undesirable interactions between the out-of-plane modes which might perturb the carrier mode motion for practical gyroscope designs where slight structural imperfections will inevitably exist.

For a gyroscope of the invention the carrier mode must be of the $\cos n\theta$ order where n has an integer value of 2 or more, such as $\cos 2\theta$, $\cos 3\theta$, $\cos 4\theta$ etc. The response modes must be of the $\sin n_1\theta$ or $\cos n_1\theta$ where $n_1$ has a value $n+1$ or $n-1$, such as $\sin\theta$, $\sin 2\theta$, $\sin 3\theta$ etc.

Splitting the out-of-plane frequencies, while maintaining the degeneracy of the in-plane response modes, is possible if the number and orientation of support legs (not shown) for the ring 5 are correctly chosen. The legs connect the ring 5 to a central support 6 and act as point spring masses which locally perturb the mode dynamics. In order to prevent frequency splitting the number and angular location of the legs must be matched to the mode symmetry. For any $\cos n\theta$ degenerate mode pair this number is given by the following expression:

$$\text{Number of legs } N = 4n_1 \quad (6)$$

The angular separation is given by $$\frac{360°}{N}.$$

Thus for the $\cos\theta$ mode pair this condition may be achieved using four legs at 90° separation. This arrangement of support legs will split the $\cos 2\theta$ out-of-plane modes and thus fix their orientation on the ring 5 as required.

The vibratory resonator 5 is substantially planar having a substantially ring or hoop like shape structure with inner and outer peripheries extending around a fixed reference axis.

Vibrating structure gyroscopes according to the invention may be constructed using standard fabrication and machining techniques. They are also suitable for fabrication using micro-machining techniques. The principle of operation and drive and pick-off orientations will be identical regardless of the fabrication route. The resonator ring 5 may be constructed from any material possessing suitable mechanical properties including metal, quartz, polysilicon or bulk silicon. The modes of the ring 5 may be driven into oscillation using a variety of drive transducers. These include electrostatic, electromagnetic, piezoelectric and optical means. The amplitude of motion may similarly be detected using a variety of transducers including electrostatic, electromagnetic, piezoelectric or optical pick-off means. The drive and pick-off transducers are positioned such as to initiate and detect out-of-plane or in-plane motion.

Figure 11:
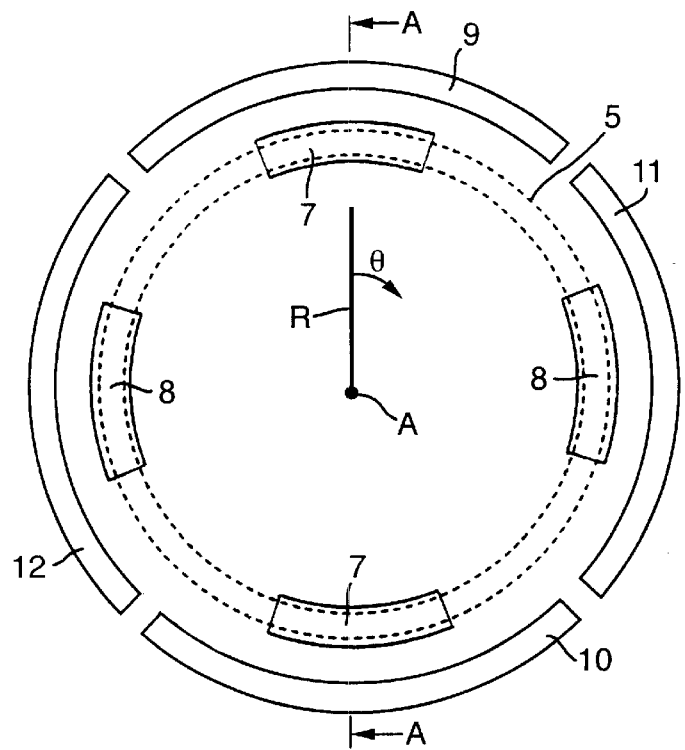
FIG. 11 is a schematic representation of part of a two axis gyroscope according to a first embodiment of the present invention showing the orientation of drive and pick-off elements.

The preferred embodiment uses electrostatic drive and pick-off means. The orientation of the drive and pick-off elements for this embodiment is shown in FIG. 11. The location of the ring 5 which has inner and outer peripheries extending around a common axis A, is indicated by the dashed lines. The out-of-plane Cos2θ carrier mode is driven into oscillation using drive elements 7 located at 0° and 180° with respect to the fixed reference axis R directly under the ring rim. The ring 5 is maintained at a fixed potential with respect to the drive elements 7 and pick-off elements 8. Individual capacitors are formed between these drive elements 7 and the opposing segments of the underside of the ring 5. An oscillating voltage is applied to the drive elements 7 at the carrier frequency thus generating an electrostatic force setting the ring 5 into resonant oscillation. The pick-off elements 8, located at 90° and 270°, similarly form capacitors which detect the motion of the ring 5 as the gap is varied.

A rotation about the x-axis will couple energy into the Cosθ in-plane response mode which has anti-nodes at 0° and 180°. Rotation about the y-axis will couple energy into the Sinθ mode which has anti-nodes at 90° and 270°. Drive and pick-off elements may be located in any appropriate combination adjacent to these points. These comprise plates located concentrically around the outer periphery of the ring 5. The plate surface normal to the plane of the ring forms a capacitor with the adjacent facing segment of the ring 5. Conveniently, the x-axis response mode motion is detected by a pick-off 9 located at 0°. A drive element 10, located at 180°, may be used to null the mode movement to allow the gyroscope to operate in a forced feedback configuration. When operated in this mode the nulling drive is proportional to the applied rate. This mode of operation is known to provide performance advantages over the open loop mode. The y-axis response mode motion is detected by a pick-off element 11, located at 90°. A drive element 12 located at 270°, allows the gyroscope to operate in force feedback mode.

Figure 12:
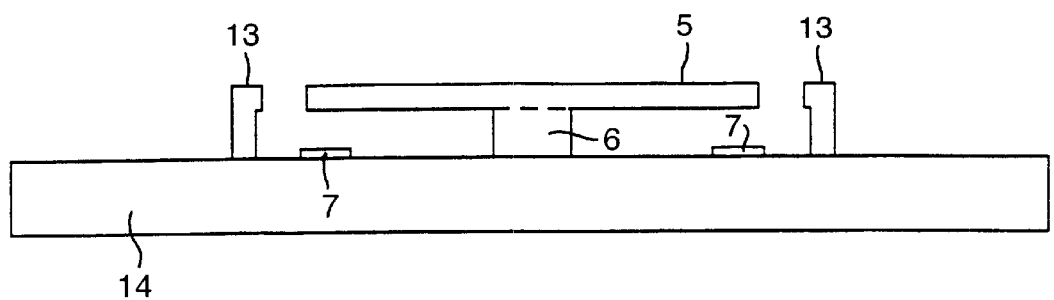
FIG. 12 is a cross sectional view taken on the plane A—A of FIG. 11 but with additional parts not shown in FIG. 11.

FIG. 12 shows a cross-sectional view along line A—A in FIG. 11 through the centre of the ring resonator 5 along the y-axis showing additional detail of the device. X and y axis drive and pick-off elements 9, 10, 11, 12 are conductive sites 13 laid onto the surface of an electrically insulating substrate layer 14. These sites 13 are connected via tracks to bond pads (not shown) which can be electrically connected to the control circuitry. The ring 5 is attached via the support legs (not shown) to the central support 6. This support 6 extends beneath the ring 5 and support legs are freely suspended above the substrate layer 14. The out-of-plane mode drives and pick-off elements 7, 8 are rigidly attached to the substrate 14 with tracking and bond pads (not shown) provided as required to enable connection to control circuitry.

Additional modifications to the gyroscope of FIGS. 11 and 12 are possible. For example, the addition of a second insulating substrate layer (not shown) rigidly fixed above the resonator ring 5, duplicating the out-of-plane drive and pick-off capacitor element sites 13, would enhance the sensitivity of the gyroscope along the x and y axes. This would, however, complicate the fabrication process and would not alter the essential design features or functionality of the gyroscope.

A two axis gyroscope of the invention may be fabricated using the same Cos2θ out-of-plane carrier mode in combination with Sin3θ and Cos3θ in-plane response modes. For this design it is necessary to maintain the Cos3θ in-plane mode symmetry while separating the out-of-plane Cos2θ mode frequencies. This is achieved using twelve support legs with a 30° angular separation.

Figure 13:
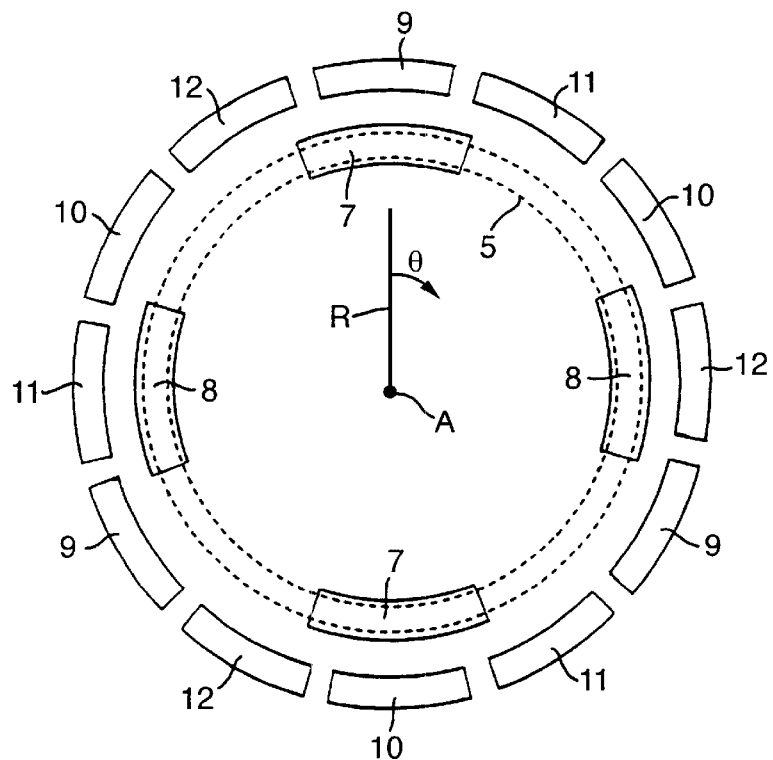
FIG. 13 is a schematic arrangement showing the drive and pick-off elements for a two axis gyroscope according to a second embodiment of the present invention.

The appropriate arrangement of drive and pick-off elements is shown in FIG. 13. The carrier mode drive elements 7 are located at 0° and 180° with pick-off elements 8 at 90° and 270°. A rotation about the x-axis will excite the Cos3θ response mode. The x axis response mode pick-off elements 9 are located at 0°, 120° and 240° with the drive elements 10 located at 60°, 180° and 300°. A rotation about the y-axis will excite the Sin3θ response mode. The y axis mode pick-off elements 11 are located at 30°, 150° and 270° with the drive elements 12 at 90°, 210° and 330°.

Figure 14:
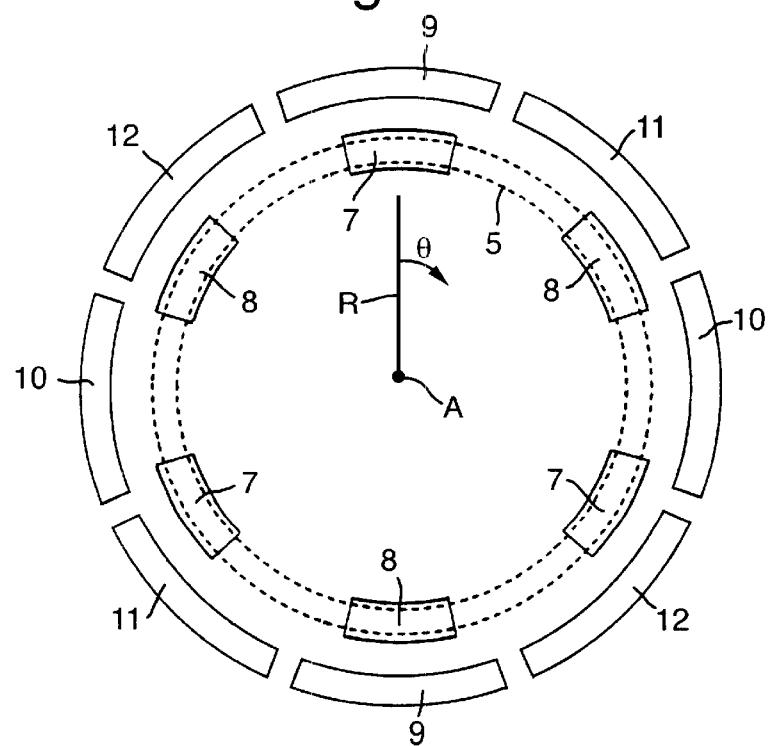
FIG. 14 is a schematic representation showing the drive and pick-off elements for a two axis gyroscope according to a third embodiment of the present invention.

A two axis gyroscope of the invention may be fabricated using a Cos3θ out-of-plane carrier mode in combination with Sin2θ and Cos2θ in-plane response modes. Maintaining the mode symmetry of the in-plane response modes will require the use of eight support legs with a 45° angular separation. The drive and pick-off element orientations for this implementation are shown in FIG. 14. The carrier mode drive elements 7 are located at 0°, 120° and 240° with pick-off elements 8 located at 60°, 180° and 300°. A rotation about the x-axis will excite the cos2θ response mode. The pick-off elements 9 for this mode are located at 0° and 180° with drive elements 10 located at 90° and 270°. A rotation about the y-axis will excite the Sin2θ response mode. The pick-off elements 11 for this mode are located at 45° and 225° with drive elements 12 located at 135° and 315°.

Figure 15:
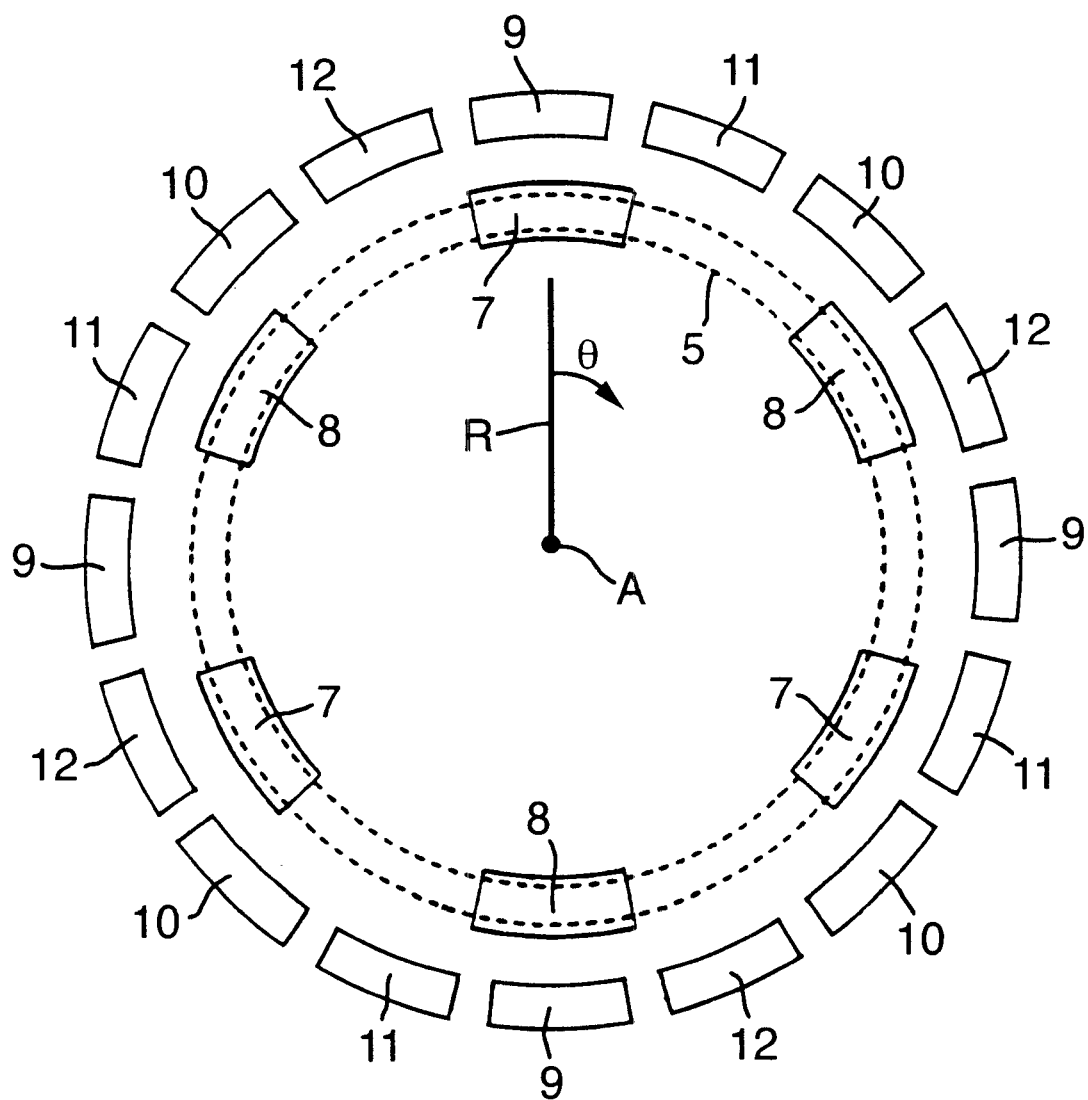
FIG. 15 is a schematic representation showing the drive and pick-off elements for a two axis gyroscope according to a fourth embodiment of the present invention.

A two axis gyroscope of the invention may also be fabricated using this same Cos3θ carrier mode in combination with Sin4θ and Cos4θ in-plane response modes. Maintaining the symmetry of the in-plane response modes in this instance requires the use of sixteen support legs with an angular spacing of 22.5°. The drive and pick-off element orientations for this implementation are shown in FIG. 15. The carrier mode drive elements 7 are located at 0°, 120° and 240° with pick-off elements 8 located at 60°, 180° and 300°. A rotation about the x-axis will excite the cos 4θ response mode. The pick-off elements 9 for this mode are located at 0°, 90°, 180° and 270° with drive elements 10 located at 45°, 135°, 225° and 315°. A rotation about the y-axis will excite the Sin4θ response mode. The pick-off elements 11 for this mode are located at 22.5°, 112.5°, 202.5° and 292.5° with drive elements 12 located at 67.5°, 157.5°, 247.5° and 337.5°.

Two axis rate gyroscopes of the invention may be fabricated using higher order in-plane and out-of-plane mode combinations, subject to out-of-plane modes meeting Cosnθ where n has an integer value of two or more and in-plane X and Y axis response modes meeting Cos $n_1\theta$ and Sin $n_1\theta$ where $n_1$ has a value of n+1 or n−1 with the X and Y axis response modes values being identical. These will require progressively higher numbers of support legs to maintain the necessary mode symmetries and a larger number of drive pick-off elements. As a result these embodiments, while feasible, become progressively more complicated to fabricate, particularly in a small size.

In the foregoing description angular location of the drive and pick off elements is with respect to the fixed reference axis R in the plane of the resonator. Also in a gyroscope of the invention for sensing rate about two axes, the resonator 2 and support means are dimensioned so that the Cosnθ out-of-plane carrier mode and $Sinn_1\theta$ and $Cosn_1\theta$ out-of-plane response mode frequencies are matched.

What is claimed is:

1. A two axis gyroscope including a substantially planar vibratory resonator having a substantially ring or hoop-like shape structure with inner and outer peripheries extending around a common axis, carrier mode drive means for causing the resonator to vibrate in a $\cos n\theta$ out-of-plane carrier mode, where n has an integer value of 2 or more, support means for flexibly supporting the resonator and for allowing the resonator to vibrate, in response to the carrier mode drive means, relative to the support means, carrier mode pick-off means for sensing out-of-plane movements of the resonator, X axis response mode pick-off means for sensing in-plane $\cos n_1\theta$ response mode movement of the resonator in response to rotation of the gyroscope about the X axis where $n_1$ has a value of n plus 1 or n minus 1, and Y axis response mode pick-off means for sensing in-plane $\sin n_1\theta$ response mode movement of the resonator in response to rotation of the gyroscope about the Y axis, where $n_1$ has a value of n plus 1 or n minus 1, identical to that for the X axis response mode.

2. A gyroscope according to claim 1, including X axis response mode drive means for nulling the X axis response mode movement of the resonator to permit the gyroscope to be operated in a forced feedback configuration.

3. A gyroscope according to claim 1 including Y axis response mode drive means for nulling the Y axis response mode movement of the resonator to permit the gyroscope to be operated in a forced feedback configuration.

4. A gyroscope according to claim 1 wherein the support means includes a plurality of flexible legs flexibly connecting the resonator to a support, with the number of legs being given by N equals $4n_1$ and with the angular separation between the legs being given by 360° divided by N.

5. A gyroscope according to claim 1 wherein the resonator is made from metal, quartz, polysilicon or bulk silicon.

6. A gyroscope according to claim 1 wherein the drive means and/or the pick-off means are electrostatic, electromagnetic, piezo or optical.

7. A gyroscope according to claim 1 wherein the carrier mode is a $\cos 2\theta$ out-of-plane mode, the X axis response mode is an in-plane $\cos\theta$ mode, and the Y axis response mode is an in-plane $\sin\theta$ mode, with the carrier mode drive means including two drive elements located at 0° and 180° with respect to a fixed reference axis in the plane of the resonator, with the carrier mode pick-off means including two pick-off elements located at 90° and 270° with respect to the fixed reference axis, with the X axis pick-off means including a pick-off element located at 0° with respect to the fixed reference axis, with the Y axis pick-off means including a pick-off element located at 90° with respect to the fixed reference axis, with the X axis drive means including a drive element located at 180° with respect to the fixed reference axis and with the Y axis drive means including a drive element located at 270° with respect to the fixed reference axis.

8. A gyroscope according to claim 1 wherein the carrier mode is a $\cos 2\theta$ out-of-plane mode, the X axis response mode is an in-plane $\cos 3\theta$ mode, and the Y axis response mode is an in-plane $\sin 3\theta$ mode, with the carrier mode drive means including two drive elements located at 0° and 180° with respect to a fixed reference axis in the plane of the resonator, with the carrier mode pick-off means including two pick-off elements located at 90° and 270° with respect to the fixed reference axis, with the X axis pick-off means including three pick-off elements located at 0°, 120° and 240° with respect to the fixed reference axis, with the Y axis pick-off means including three pick-off elements located at 30°, 150° and 270° with respect to the fixed reference axis, with the X axis drive means including three drive elements located at 60°, 180° and 300° with respect to the fixed reference axis and with the Y axis drive means including three drive elements located at 90°, 210° and 330° with respect to the fixed reference axis.

9. A gyroscope according to claim 1 wherein the carrier mode is a $\cos 3\theta$ out-of-plane mode, the X axis response mode is an in-plane $\cos 2\theta$ mode, and the Y axis response mode is an in-plane $\sin 2\theta$ mode, with the carrier mode drive means including three drive elements located at 0°, 120° and 240° with respect to a fixed reference axis in the plane of the resonator, with the carrier mode pick-off means including three pick-off elements located at 60°, 180° and 300° with respect to the fixed reference axis, with the X axis pick-off means including two pick-off elements located at 0° and 180° with respect to the fixed reference axis, with the Y axis pick-off means including two pick-off elements located at 45° and 225° with respect to the fixed reference axis, with the X axis drive means including two drive elements located at 90° and 270° with respect to the fixed reference axis, and with the Y axis drive means including two drive elements located at 135° and 315° with respect to the fixed reference axis.

10. A gyroscope according to claim 1 wherein the carrier mode is a $\cos 3\theta$ out-of-plane mode, the X axis response mode is an in-plane $\cos 4\theta$ mode, and the Y axis response mode is an in-plane $\sin 4\theta$ mode, with the carrier mode drive means including three drive elements located at 0°, 120° and 240° with respect to a fixed reference axis in the plane of the resonator, with the carrier mode pick-off means including three pick-off elements located at 60°, 180° and 300° with respect to the fixed reference axis, with the X axis pick-off means including four pick-off elements located at 0°, 90°, 180° and 270° with respect to the fixed reference axis, with the Y axis pick-off means including four pick-off elements located at 22.5°, 112.5°, 202.5° and 292.5° with respect to the fixed reference axis, with the X axis drive means including four drive elements located at 45°, 135°, 225° and 315° with respect to the fixed reference axis, and with the Y axis drive means including four drive elements located at 67.5°, 157.5°, 247.5° and 337.5° with respect to the fixed reference axis.

11. A gyroscope according to claim 2, including Y axis response mode drive means for nulling the Y axis response mode movement of the resonator to permit the gyroscope to be operated in a forced feedback configuration.

12. A gyroscope according to claim 2, wherein the support means includes a plurality of flexible legs flexibly connecting the resonator to a support, with the number of legs being given by N equals $4n_1$ and with the angular separation between the legs being given by 360° divided by N.

13. A gyroscope according to claim 3, wherein the support means includes a plurality of flexible legs flexibly connecting the resonator to a support, with the number of legs being given by N equals $4n_1$ and with the angular separation between the legs being given by 360° divided by N.

14. A gyroscope according to claim 2, wherein the resonator is made from metal, quartz, polysilicon or bulk silicon.

15. A gyroscope according to claim 3, wherein the resonator is made from metal, quartz, polysilicon or bulk silicon.

16. A gyroscope according to claim 4, wherein the resonator is made from metal, quartz, polysilicon or bulk silicon.

17. A gyroscope according to claim 2, wherein the drive means and/or the pick-off means are electrostatic, electromagnetic, piezo or optical.

18. A gyroscope according to claim 3, wherein the drive means and/or the pick-off means are electrostatic, electromagnetic, piezo or optical.

19. A gyroscope according to claim 4, wherein the drive means and/or the pick-off means are electrostatic, electromagnetic, piezo or optical.

* * * * *

UNITED STATES PATENT AND TRADEMARK OFFICE
CERTIFICATE OF CORRECTION

PATENT NO.     : 6,401,534 B1
DATED          : June 11, 2002
INVENTOR(S)    : Fell et al.

It is certified that error appears in the above-identified patent and that said Letters Patent is hereby corrected as shown below:

<u>Title page,</u>
Item [75], change "Hnery" to -- Henry --.
Item [73], change "Bae Systems PLC" to -- BAE SYSTEMS plc --.

Signed and Sealed this

Third Day of December, 2002

JAMES E. ROGAN
*Director of the United States Patent and Trademark Office*